United States Patent [19]

Poppe et al.

[11] 4,055,608

[45] Oct. 25, 1977

[54] DYEABLE POLYPROPYLENE CONTAINING BISULFATE

[75] Inventors: Wassily W. Poppe, Lombard; Mark D. Inskeep, Downers Grove, both of Ill.

[73] Assignee: Standard Oil Company (Indiana), Chicago, Ill.

[21] Appl. No.: 702,438

[22] Filed: July 6, 1976

[51] Int. Cl.$^2$ .................................... C08L 77/00
[52] U.S. Cl. ........................... 260/857 L; 260/859 R; 260/895; 260/897 R; 260/897 B; 260/901
[58] Field of Search ............ 260/857 L, 23 H, 859 R, 260/897 B, 897 R, 895, 901; 8/21 B, 21 D

[56] References Cited

U.S. PATENT DOCUMENTS

| 3,326,826 | 6/1967 | Cohen | 260/857 L |
| 3,433,853 | 3/1969 | Earle | 260/857 L |
| 3,465,060 | 9/1969 | Oldham | 260/857 L |
| 3,494,980 | 2/1970 | Lees | 260/857 L |
| 3,505,429 | 4/1970 | Press | 260/857 L |
| 3,554,933 | 1/1971 | Grainger | 260/857 L |
| 3,621,075 | 11/1971 | Cleary | 260/857 L |
| 3,690,811 | 9/1972 | Horning | 8/21 B |
| 3,744,968 | 7/1973 | Fuest | 8/21 D |

FOREIGN PATENT DOCUMENTS

| 1,143,763 | 2/1969 | United Kingdom | 8/21 B |

OTHER PUBLICATIONS

Du Pont, The Technical Bulletin, vol. 5, No. 2, June 1949.

*Primary Examiner*—Paul Lieberman
*Attorney, Agent, or Firm*—William H. Magidson; Arthur G. Gilkes; William T. McClain

[57] ABSTRACT

Polypropylene compositions comprising resinous polymer of propylene, thermoplastic polymer containing amino groups and alkali metal bisulfate.

27 Claims, No Drawings

DYEABLE POLYPROPYLENE CONTAINING BISULFATE

This invention relates to polypropylene compositions, fibers produced from said compositions, fabrics woven from said fibers and tufted carpeting produced from said woven fabrics comprising a resinous polymer of propylene, a thermoplastic polymer containing amino groups and an alkali metal bisulfate.

As pointed out in Earle et al., U.S. Pat. No. 3,433,853 and Fuerst, U.S. Pat. No. 3,744,968, which are incorporated by reference, polyolefin articles can normally be dyed only with difficulty due to the complete lack of polar groups in the polymer molecule. These references indicate that this problem can be overcome by employing a composition comprising a polymer containing amino groups and the polyolefin polymer. Fuerst indicates that the higher the concentration of nitrogenous polymer, the poorer the properties of the fiber. To improve the fiber properties Fuerst reduces the concentration of amino polymer by treating the articles with anionic surfactants prior to or together with the desired dye at a pH between 0 and 5 (column 6, lines 49 to 54).

As pointed out in Horning, U.S. Pat. No. 3,690,811, which is incorporated by reference, polypropylene ribbon yarn fabrics have been used extensively as backings for various carpets. Although these polypropylene backings have had great acceptance, the poor dyeability of polypropylene has been a drawback since it is aesthetically undesirable to have the polypropylene backing show through when the tufted carpet and polypropylene backing are different hues. In some cases, particularly on staircases, it is very difficult to avoid the backing showing through. In order to overcome this type of difficulty, U.S. Pat. No. 3,690,811 suggests incorporating polyamides formed from a dicarboxylic acid and a diamine containing internal tertiary amine groups into the polypropylene fibers to enhance their dyeability. The patentee indicates that when nylon face yarns are employed, the dye bath should be adjusted to pH 3 to 3.5 (column 4, lines 69 to column 5, line 27). Unfortunately, the custom of this industry (nylon faced carpet industry) is to dye at a pH of about 6.5. At pH 6.5, the polycarbonamide additive is relatively ineffective in alleviating the aesthetically undesirable grinning of undyed or slightly dyed polypropylene carpet backing.

Although applicants have been able to overcome the aforesaid problems by activating ribbon yarns comprising resinous polymers of propylene and nitrogenous esins in acidic baths prior to weaving the carpet backing, this step is economically unattractive. Accordingly, there is a need for polypropylene compositions that can be fabricated into woven fabrics by conventional techniques, which can be dyed at about pH 6.5.

The general object of this invention is to provide polypropylene compositions capable of being fabricated into woven fabrics by conventional techniques, which can be dyed at about pH 6.5. Other objects appear hereinafter.

We have now found that compositions comprising a resinous polymer a propylene, a thermoplastic polymer containing amino groups and an alkali metal acid sulfate can be extruded into shaped objects, such as ribbon yarns; the ribbon yarns woven into carpet backing; the carpet backing tufted with face yarn; and the tufted carpet dyed at about pH 6.5. Surprisingly, the alkali metal acid sulfate acts as an internal activator facilitating dyeing at about pH 6.5. Further, the alkali metal bisulfate does not have a deleterious effect on the extrusion of polypropylene shaped objects such as fiber, films, etc.

For the purpose of this invention, the term "resinous polymer of propylene" includes polymers containing at least 75% by weight propylene, such as substantially crystalline homopolymeric polypropylene, propyleneethylene block, random or multi-segment copolymers containing up to 25% by weight ethylene units in the polymer, etc.

The alkali metal bisulfates useful in this invention include sodium bisulfate, potassium bisulfate, etc. The alkali metal bisulfate (on an anhydrous basis) can be used in a concentration of 0.1 to 5 parts by weight, preferably 0.2 to 2 parts by weight per each 100 parts by weight resinous polymer of propylene and thermoplastic polymer containing amino groups. In general, it is preferred to use the minimum concentration of alkali metal bisulfate consistent with the desired dyeability in order to extrude at maximum rates and to minimize water pick up during processing of the shaped extrudate (film or fiber).

The thermoplastic polymers containing amino groups useful in this invention include polymers containing amino groups as integral parts of the polymer chain (e.g. polycarbonamides of the types described by Earle & Horning) or pendant from the polymer (e.g., addition polymers of alpha, beta-ethylenically unsaturated compounds having pendant amino groups). Suitable polymers include polycarbonamides of dicarboxylic acid compounds and diprimary amines containing internal secondary or tertiary amine groups; reaction products of ethylene-maleic anhydride or styrene-maleic anhydride copolymers with an omega-(dialkylamino)alkylamine (wherein the alkyl groups contain from 1 to 5 carbon atoms), the product being an aminoimide [the preparation of such materials have been described by Cohen & Minsh, J. Org. Chem. 24, 1404, (1959)]; the reaction product of N-methyl-(bis-aminopropyl)amine with 2,4-tolylene diisocyanate, the product being a poly(amino-urea); the copolymers of ethylene or styrene with mono- or dialkyl ($C_1$ to $C_5$) aminoalkyl ($C_1$ to $C_5$) acrylates or methacrylates; and water-insoluble derivatives of polyethylene imine, which are the reaction products of an alkylbenzyl halide and polyethyleneimine wherein the alkyl groups contain from 6 to 20 carbon atoms, preferably from 8 to 12 carbon atoms. The degree of substitution upon the nitrogen atoms available for substitution can vary from 15 to 100% depending upon the size of the alkyl group and the final nitrogen percentage desired. All of these amino containing polymers are discussed in greater detail in Fuerst, U.S. Pat. No. 3,744,968, which is incorporated by reference.

The preferred amino contaning polymers useful in this invention are polycarbonamides, such as those described in Earle et al., U.S. Pat. No. 3,433,853, and particularly the polyimidazoline employed in application Ser. No. (Case 12759) filed on even date in name of Poppe et al, which is incorporated by reference. The polyimidazoline polycarbonamides are polymers of diethylene triamine, a diprimary diamine, preferably a diprimary alkylene diamine containing 2 to 12 carbon atoms in each alkylene group and at least one dicarboxylic acid compound, having a melting point of at least 50° C. and an imidazoline number of at least 20, preferably at least 55.

The amino number of the amino containing polymers, which includes the primary amino groups, secondary amino groups and imidazoline groups, is defined as the number of milligrams of potassium hydroxide equivalent to the amine alkalinity present in a one gram sample of resin. The imidazoline number of the preferred polycarbonamides is defined as the milligrams of potassium hydroxide equivalent to the imidazoline groups present in a one gram sample of the resin. Both are determined by potentiometric titration of polymer dissolved in nitrobenzene containing acetic acid, using perchloric acid (0.1N) for titration. The difference in the methods of determining total amine number in contrast to imidazoline number resides in the use of phenylisothiocyanate to first react with the primary and secondary amino groups in the polymer to form non-basis thioures.

Briefly, the polyimidazoline polycarbonamides can be produced by reacting a composition comprising diethylene triamine, diprimary amine and a dicarboxylic acid compound under conditions sufficient to provide a polymer having a melting point of at least 50° C. and an imidazoline number of at least 20, preferably at least 55.

The diprimary diamines are necessary to provide a polyamide having a sufficiently high melting point to be extruded easily with the resinous polymer of propylene. In the absence of dprimary diamine the polyamide tends to be too low melting to be handled efficaciously. One or more alkylene diprimary diamines can be used having the structure $NH_2$-R-$NH_2$ wherein R is an alkylene group of from 2 to 12 carbon atoms. Suitable diamines include ethylene diamine, 1,3-propylene diamine, 1,2-propylene diamine, tetramethylene diamine, hexamethylene diamine, dodecamethylene diamine, etc. Of these hexamethylene diamine is preferred.

While the mole ratio of diprimary diamine to diethylenetriamine can range from about 1:3 to 3:1, the most advantageous ratio is dependent on the particular diprimary diamine and the desired imidazoline number. In general, other things being equal, the higher the concentration of diethylene triamine the higher the imidazoline number attainable and the lower the melting point of the polymer. The higher the imidazoline number the better the dyeability of the final polypropylene composition. When hexamethylene diamine is employed as the only diprimary amine, the mole ratio of diethylene triamine to hexamethylene diamine is preferably about 3:1 to 1:1. Other things being equal, the resultant polyimidazole polycarbonamides based on hexamethylene diamine produced from this ratio (3:1 to 1:1) of polyamines can have a high imidazoline number and are capable of imparting excellent dyeability to resinous polymers of propylene and the resultant polymer composition can be extruded advantageously without pressure build up.

The dicarboxylic acid compounds (free acids, anhydrides or esters) useful for producing the preferred polyimidazoline polycarbonamides include saturated straight chain aliphatic dicarboxylic acids, such as succinic acid, sebacic acid, adipic acid, adipic anhydride, suberic acid, azelaic acid, dimethyl azelate, glutaric acid, etc.; aromatic dicarboxylic acids, such as terephthalic acid, isophthalic acid, phthalic acid, 2,6-naphthalene dicarboxylic acid, etc. Of these, the saturated aliphatic dicarboxylic acids are preferred. Polymers containing a substantial concentration of aromatic dicarboxylic acid moieties (more than 10 equivalent percent of the acyl moieties) preferably have an amine number of at least 150, whereas polymers containing less than 10 percent of the acyl equivalents aromatic dicarboxylic acid moieties preferably have an amine number of at least 100. The preferred dicarboxylic acid compounds are the saturated aliphatic straight chain dicarboxylic acids containing from about 6 to 10 carbon atoms in the dicarboxylic acid moiety.

Various other suitable polycarboxylic acid compounds include the cycloaliphatic so-called dimer acids of the type disclosed in Floyd U.S. Pat. No. 3,403,117, and Cohen, U.S. Pat. No. 3,326,826, which are incorporated by reference, which contain a small concentration of trimer acid and free monocarboxylic acid. In general, these acids are prepared by dimerizing ethylenically unsaturated monocarboxylic acids having about 8 to 22 carbon atoms. Suitable ethylenically unsaturated acids of this type include the branched and straight chain, poly- and mono-ethylenically unsaturated acids, such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, eleostearic acid, hiragonic acid, moroctic acid, timnodonic acid, eicosatetraenoic acid, nisinic acid, scoliodonic acid, chaulmoogric acid, etc. Of these the commercially available dimer acids and hydrogenated dimer acids based on the naturally occurring 18 carbon atom unsaturated tall oil fatty acids and glyceride oil saponification products are preferred. Accordingly, the preferred dimer acids are based on acids, such as oleic acid, linoleic acid, linolenic acid, etc.

If desired, aliphatic monocarboxylic acids containing from about 2 to 22 carbon atoms can also be used. Suitable monocarboxylic acids include acetic acid, propionic acid, butyric acid, stearic acid, oleic acid, linoleic acid, linolenic acid, palmitic acid, etc.

In general, the acyl equivalents in the preferred polyimidazoline polycarbonamides of this invention, which are capable of imparting optimum dyeability to polypropylene, can range from about 65 to 100 equivalent percent aliphatic dicarboxylic acid moieties and from 0 to 35 equivalent percent aliphatic monocarboxylic acid moieties, cycloaliphatic polycarboxylic acid moieties and mixtures thereof.

The polyimidazoline polycarbonamides useful in this invention can be produced by reaction at about 200° to 315° C. for a time sufficient to remove substantially all water of condensation and any alcohols liberated from esters, where esters are employed as the dicarboxylic acid compounds. The reactants are preferably maintained at a temperature of about 250° to 315° C. for about 1 to 4 hours until the polycarbonamide has the desired imidazoline number. The reaction can be carried out under vacuum or using an inert atmosphere (nitrogen) to prevent darkening.

Compositions of this invention comprising from about 90 to 99.5 parts by weight resinous polymer of propylene, correspondingly 10 to .5 parts by weight thermoplastic polymer containing amino groups and from 0.1 to 5 parts alkali metal bisulfate can be extruded into shaped objects using a conventional plasticizing extruder equipped with spinnerette or film die under conventional conditions at about 450° to 550° F. Films produced in this manner can be slit and further processed into ribbon fibers of the type described by Horning which are particularly useful for weaving into primary and secondary carpet backing. Typically, the ribbon fibers are produced commercially by extruding a two to five foot wide web at high speed into a water quench bath, drying the wet film, slitting the dry film into 40 to 500 mil wide ribbon, drawing in an oven, gathering the ribbons and winding the ribbon fibers on separate spools. Due to the high speed at which this equipment is run, it is desirable to use the lowest concentration of amino containing polymer and bisulfate consistent with the level of dyeability desired, since the higher the concentration of these additives, the lower the melt viscosity of the extrudate and the more hygroscopic the ribbon film. The lower the melt viscosity, the lower the speed at which the equipment can be run. Likewise, the more hygroscopic the ribbon film, the greater the tendency of the ribbon to retain water and subsequently break during slitting and drawing. To avoid this, the web must be run at a slower speed in the drying and oven stages of the production line.

In view of the hygroscopic nature of the additives, it is generally preferred to prepare concentrates of the hygroscopic components thereby minimizing the amount of product that should be dried prior to extrusion. For example, a polymeric blend containing from 10 to 50 parts by weight thermoplastic amino polymer, from about .1 to 10 parts by weight alkali metal bisulfate (dry solids basis) and from about 40 to 89.9 parts by weight resinous polymer of propylene can be pelletized by extruding through a strand die and chopped into pellets. The pellets, prior to use, are then dried and mixed with resinous polymer of propylene and then extruded. If desired, separate concentrates of thermoplastic amino polymer with resinous polymer of propylene and alkali metal bisulfate with resinous polymer of propylene can be used. Accordingly, the composition of this invention going to the pelletizer or extruder can comprise from about 40 to 99.4 parts by weight resinous polymer of propylene, from about 0.1 to 10 parts by weight alkali metal bisulfate and from 0.5 to 50 parts by weight thermoplastic amino polymer. Drying is less of a problem if a vented extruder is employed.

It is often desirable to include from about 0.1 to 2 parts by weight oleamide and from 0.1 to 2 parts by weight silica per 100 parts by weight of the resinous components to reduce water carry over when the polypropylene compositions are extruded as shaped objects into an aqueous quench bath. The oleamide reduces water carry over while the silica helps to disperse the oleamide uniformly in the polymeric matrix. These additives can be omitted when a chill roll or air quench tunnel is employed instead of the quench bath.

The polypropylene ribbon yarn woven fabrics of this invention can be produced on a Sulzer loom using about 12 to 36 warp ends per inch. Typically, the ribbon warp yarns on the loom are produced by extruding and drawing crystalline resinous polymer or propylene composition into 1 to 5 mil thick films slitting the film into 50 to 500 mil wide ribbons, orienting the ribbons and crushing the ribbon to form 80-100 mil wide ribbon yarns. Alternatively, the ribbon yarns can be produced by extruding and drawing crystalline polymer compositions into 1 to 5 mil thick film, slitting the film into 50 mil wide ribbons and not crushing. The weft or fill yarn is provided from cones or packages of the same polypropylene ribbon yarn used for the warp. The woven fabric can be tufted with face yarns, such as nylon 6 or 66 and dyed by conventional techniques.

The dyeability of some shaped objects, such as multifilament yarns having a substantially greater surface area per unit weight than the ribbon yarns, are less pH dependent. However, the alkali metal bisulfate can be added advantageously to compositions destined for this use.

The following examples are merely illustrative. In the examples that follow the imidazoline number is determined by heating and stirring a 250 ml titration beaker containing .45 grams polycarbonamide, 40 ml nitrobenzene and 5 ml isoprpyl alcohol with a stirring bar on a hot plate covered with a condenser. The hot plate surface temperature is maintained at 120° ± 3° C. to establish a solution temperature of 80° C. ± 3° C. until the polycarbonamide is in solution but not more than 30 minutes in all. The hot plate temperature is then lowered to 100° C. ± 3° C. thereby lowering the solution temperature to 65° C. ± 3° C. At this point 5 ml phenylisothiocyanate solution is added with stirring and heating continued for twenty minutes. After 5 ml isopropyl alcohol and 50 ml glacial acetic acid is added, the sample is titrated potentiometrically with 0.1 N perchloric acid in glacial acetic acid. The imidazoline number is determined by multiplying the milliliters of perchloric acid by the normality of the perchloric acid by 56.1 and dividing that product by the same weight in grams of the polycarbonamide.

The amine number of the sample is determined in the same manner as the imidazoline number except for the omission of the phenylisothiocyanate addition and heating step.

EXAMPLE I

Sixty-two and two-tenths parts by weight stabilized homopolymeric polypropylene powder having a number average molecular weight of 110,000 and a melt flow rate of 2 to 4, 30 parts by weight polyimidazoline polycarbonamide based on diethylene triamine, hexamethylene diamine, azelaic acid and dimer acid having an amine number of 161, an imidazoline number of 78 and a Ball and Ring melting point of 133° C, 3.0 parts by weight Syloid 244 (silica), 3.0 parts by weight oleamide and 1.8 parts by weight anhydrous sodium bisulfate having a particle size less than 100 mesh, were fed to a Farrel Continuous Mixer equipped with a blending unit and extruder. The extruder was set as a melt temperature of about 410° F. and the 4-hole ⅛ inch diameter spinnerette die was set at a die temperature of about 410° F. The extrudate was chopped into ⅛ inch long pellets, dried in a circulating air oven at about 160° F. until the pellets were dry (typically 6 to 48 hours).

One-hundred parts by weight of the dried concentrate and 500 parts by weight homopolymeric polypropylene powder having a number average molecular weight of 110,000 were mixed by drum tumbling and fed to a 2-½ inch Black Clawson Film extruder having a barrel temperature of 475° F and die temperature of 475° F. The die was a 3 foot wide sheeting die having an 0.020 inch slit opening. The film was extruded into a quench bath, at ambient temperature, conveyed past an air knife and through a nip roll formed by a metal roll and a rubber roll in order to dry the extruded film. The film was slit into 250 mil wide, 20 mil thick ribbons, drawn in a drying tunnel oven (6 to 1 draw down ratio) equipped with infrared heaters set at about 350° to 370° F to produce approximately 3 mil thick ribbon yarn and wound on spindels. The Black Clawson film unit, which is capable of producing 150 pounds of film per hour, was run for ¾ of an hour without any pressure buildup in the extruder.

The dyeability of the polypropylene ribbon yarns was determined by adding 0.5 grams of polypropylene ribbon yarn produced in the preceding paragraph, 1 gram medium dyeable nylon face yarn and 0.075 grams of the appropriate dye (Acid Red 151, Acid Blue 25, Acid Yellow 40 or Acid Green 25) to 60 milliliters water. After the pH 6.5 dye bath was held at a boil for 2 hours, the polypropylene ribbon yarn and nylon face yarn were removed from the dye bath, washed with water and dried. In each case (red, dye, yellow dye, blue dye and green dye), the ribbon yarn and the nylon face yarn both had an intense hue of approximately the same intensity.

This example clearly illustrates that it is possible to produce pH 6.5 dyeable polypropylene ribbon yarns from compositions comprising a resinous polymer of propylene, an amino containing resin and an alkali metal bisulfate.

The polyimidazoline polycarbonamide used in this example is produced by charging 253 grams dimer acid, 563 grams azelaic acid, 233 grams diethylene triamine and 189 grams hexamethylene diamine to a reactor equipped with a short Vigreaux column, adding 10 drops phosphoric acid catalyst and 15 grams anti-foam agent, stirring and heating the reactants to 170° C over a period of 1½ hours and then maintaining the reaction at 280° C for 2 hours prior to cooling.

EXAMPLE II

This example illustrates how the dyeability of polypropylene ribbon yarns depends upon the presence of the alkali metal bisulfate activator. In order to obtain reasonable dyeability in the absence of the alkali metal bisulfate, the dyeability was tested at pH 5.0 without the presence of competing nylon face yarn. Ninety-four parts by weight stabilized homopolymeric polypropylene powder having a number average molecular weight of 110,000 and a melt flow rate of 2 to 4, 5 parts by weight polycarbonamide powder, 0.5 parts by weight Syloid 244 (silica) and 0.5 parts by weight oleamide were drum tumbled for about 1 hour and pelletized in a 1-¾ inch Prodex compounding extruder having a barrel temperature of about 450° F, equipped with a 4-hole ⅛ inch diameter spinnerette die at a die temperature of about 450° F. The extrudate was chopped into ⅛ long pellets, dried in a circulating air oven at about 160° F. for 6 to 48 hours or until the pellets were dry. The dried pellets were fed to a 1-½ inch Stirling film extruder having a barrel temperature of about 475° F, equipped with a 6 inches wide slit die having a 0.022 inch slit opening at about 475° F. The film was extruded into a quench bath, at ambient temperature, conveyed past an air knife, slit into 250 mil wide, 20 mil thick ribbons, drawn into a drying tunnel oven (6 to 1 drawn down ratio) equipped with infrared heaters set at about 350° to 370° F. to produce approximately 3 mil thick ribbons and wound on spindles.

The dyeability of the polypropylene ribbon yarns produced in the preceding paragraph was determined by adding 0.5 grams of the polypropylene ribbon yarn, and 0.075 grams Acid Red 151 to 60 milliters water, which was acidified with acetic acid to pH 5.0. After the dye bath was held at a boil for 2 hours the polypropylene ribbon yarn was removed from the dye bath and washed with water. The results are set forth below in Table I with more details about the polycarbonamide following the Table.

This example was also repeated using 93.7 parts by weight stabilized homopolymeric polypropylene powder, 5 parts by weight polycarbonamide powder, 0.3 parts by weight sodium bisulfat (dry solids basis) 0.5 parts by weight Syloid 244 and 0.5 parts by weight oleamide. The dyeability of the ribbon yarns were determined by the method described in Example I at pH 6.5 in the presence of medium dyeability nylon face yarn and Acid Red 151. The results are set forth below in Table I.

TABLE I

| Poly-carbon-amide | Imid-azoline No. | Amine No. | Melting Point in 0° C. | Dyeability at ph 5.0 | Dyeability at pH 6.5 in presence of nylon |
|---|---|---|---|---|---|
| A | 78 | 161 | 133 | Excellent | Excellent |
| B | 75 | 195 | 86 | Excellent | Excellent |
| C | 74 | 152 | 142 | Good | Good |
| D | 57 | 150 | 120 | Good | Excellent |
| E | 57 | 146 | 119 | Fair | Fair |
| F | 57 | 79 | 158 | Fair | Excellent |
| G | 48 | 143 | 165 | Fair | Excellent |
| H | 35 | 42 | 185 | Poor | Good |
| J | 0 | 169 | 149 | Poor | Good |
| K | 38 | 73 | 183 | Poor | Good |

The polycarbonamides in the above table were produced by the method of Example I using the following reactants:

A  Polyimidazoline polycarbonamide of Example I.
B  Dimer acid, azelaic acid, diethylene triamine and hexamethylene diamine.
C  Dimer acid, isophthalic acid, diethylene triamine and hexamethylene diamine
D  Stearic acid, isophthalic acid, diethylene triamine and hexamethylene diamine.
E  Oleic acid, isophthalic acid, diethylene triamine and hexamethylene diamine.
F  .53 moles stearic acid, 4.21 moles azelaic acid, 2.95 moles diethylene triamine and 2.31 moles hexamethylene diamine.
G  1.0 moles dimer acid, 3.6 moles adipic acid, 2.9 moles diethylene triamine and 2.4 moles hexamethylene diamine.
H  .53 moles stearic acid, 4.21 moles azelaic acid and 2.95 moles diethylene triamine and 2.31 moles hexamethylene diamine.
J  Azelaic acid, bis(aminopropyl)piperazine and hexamethylene diamine.
K  Lauric acid, azelaic acid, diethylene triamine and hexamethylene diamine.

The above data illustrates that alkali metal bisulfates act as internal activators facilitating dying at pH 6.5 of shaped objects produced from resinous polymers of propylene and thermoplastic polymers containing amine groups.

EXAMPLE III

This example illustrates the production of dyeable multifilament yarns based on the compositions of this invention. Ninety-four and seven-tenths parts by weight stabilized homopolymeric polypropylene powder having a number average molecular weight of 50,000 and a melt flow rate of 8 to 9, 5 parts by weight of the polyimidazoline polycarbonamide employed in Example I of this application and 0.3 parts by weight anhydrous sodium bisulfate was pelleted by the method of Example II. The pellets were fed into a 1 inch Modern Plastics Machinery MPM multiflament extruder equipped with a 34 hole, 0.0375 inch thick spinnerette die, each hole having a 0.025 inch diameter. The barrel temperature was maintained at 400°–445° F, the die and melt temperature of the composition passing through the die was maintained at 460° F developing a head pressure of about 500 psi. The filaments were extruded downwardly from the spinnerette die through a six foot long air quenching tunnel over a Godet moving at 600 rpm to a spindle takeup forming a 34 filament 575 denier spun polypropylene yarn. The yarn was then redrawn at a 4 to 1 drawn down ratio in a 325° F hot air oven yielding a 160 denier yarn (4.7 denier per filament). The fiber was dyed at pH 6.5 in the manner described in Example I. The polypropylene yarns had intense hues after drying with Acid Red 151. Acid Blue 25, Acid Yellow 40 and Acid Green 25.

This example clearly illustrates that polypropylene filament yarn of this invention containing approximately 5% by weight polyimidazoline polycarbonamide and 0.3% sodium bisulfate can be dyed to intense colors at pH 6.5.

We claim:

1. A resinous composition comprising from about 40 to 99.4 parts by weight resinous polymer of propylene, from about 0.1 to 10 parts by weight alkali metal bisulfate and from 0.5 to 50 parts by weight thermoplastic amino polymer.

2. The resinous composition of claim 1 wherein said thermoplastic amino polymer comprises a polycarbonamide.

3. The resinous composition of claim 2 wherein said polycarbonamide comprises a polyimidazoline polycarbonamide having an imidazoline number of at least 20 and a melting point of at least 50° C.

4. The resinous composition of claim 3 wherein said polyimidazoline polycarbonamide contains moieties provided by diethylene triamine and a diprimary alkylene diamine containing from 2 to 12 carbon atoms in the alkylene group and the mol ratio of alkylene diprimary diamine to diethylene triamine ranges from about 1:3 to 3:1.

5. The resinous composition of claim 4 wherein the acyl moieties of said polyimidazoline polycarbonamide comprise less than 10 equivalent percent aromatic dicarboxylic acid moieties and said polymer has an amine number of at least 100.

6. The resinous composition of claim 5 wherein said polyimidazoline polycarbonamide has an imidazoline number of at least 55.

7. The resinous composition of claim 6 wherein said alkali metal bisulfate comprises sodium bisulfate.

8. The resinous compostion of claim 7 wherein said alkylene diamine comprises hexamethylene diamine.

9. The resinous composition of claim 8 wherein the acyl moieties in said polyimidazoline polycarbonamide comprise moieties of a saturated aliphatic dicarboxylic acid.

10. The process of producing a dyeable polypropylene shaped object which comprises extruding a resinous composition comprising from about 90 to 99.5 parts by weight resinous polymer of propylene, 10 to 0.5 parts by weight thermoplastic polymer containing amino groups and from 0.1 to 5 parts by weight alkali metal bisulfate.

11. The process of claim 10 wherein said thermoplastic amino polymer comprises a polycarbonamide.

12. The process of claim 11 wherein said polycarbonamide comprises a polyimidazoline polycarbonamide having an imidazoline number of at least 20 and a melting point of at least 50° C.

13. The process of claim 12 wherein said polyimidazoline polycarbonamide contains moieties provided by diethylene triamine and a diprimary alkylene diamine containing from 2 to 12 carbon atoms in the alkylene group and the mol ratio of alkylene diprimary diamine to diethylene triamine ranges from about 1:3 to 3:1.

14. The process of claim 13 wherein the acyl moieties of said polyimidazoline polycarbonamide comprise less than 10 equivalent percent aromatic dicarboxylic acid moieties and said polymer has an amine number of at least 100.

15. The process of claim 14 wherein said polyimidazoline polycarbonamide has an imidazoline number of at least 55.

16. The process of claim 15 wherein said alkali metal bisulfate comprises sodium bisulfate.

17. The process of claim 16 wherein said alkylene diamine comprises hexamethylene diamine.

18. The process of claim 17 wherein the acyl moieties in said polyimidazoline polycarbonamide comprise moieties of a saturated aliphatic dicarboxylic acid.

19. A dyeable polypropylene shaped object comprising from about 90 to 99.5 parts by weight resinous polymer of polypropylene, 10 to 0.5 parts by weight thermoplastic polymer containing amino groups and from 0.1 to 5 parts alkali metal bisulfate.

20. The article of claim 19 wherein said thermoplastic amino polymer comprises a polycarbonamide.

21. The article of claim 20 wherein said polycarbonamide comprises a polyimidazoline polycarbonamide having an imidazoline number of at least 20 and a melting point of at least 50° C.

22. The article of claim 21 wherein said polyimidazoline polycarbonamide contains moieties provided by diethylene triamine and a diprimary alkylene diamine containing from 2 to 12 carbon atoms in the alkylene group and the mol ratio of alkylene diprimary diamine to diethylene triamine ranges from about 1:3 to 3:1.

23. The article of claim 22 wherein the acyl moieties of said polyidazoline polycarbonamide comprise less than 10 equivalent percent aromatic dicarboxylic acid moieties and said polymer has an amine number of at least 100.

24. The article of claim 23 wherein said polyimidazoline polycarbonamide has an imidazoline number of at least 55.

25. The article of claim 24 wherein said alkali metal bisulfate comprises sodium bisulfate.

26. The article of claim 25 wherein said alkylene diamine comprises hexamethylene diamine.

27. The article of claim 26 wherein the acyl moieties in said polyimidazoline polycarbonamide comprises moieties of a saturated aliphatic dicarboxylic acid.

* * * * *